(12) United States Patent
Cagle et al.

(10) Patent No.: US 11,572,481 B2
(45) Date of Patent: Feb. 7, 2023

(54) INKJET INK COMPOSITION

(71) Applicant: HEWLETT-PACKARD DEVELOPMENT COMPANY, L.P., Spring, TX (US)

(72) Inventors: Phillip C. Cagle, San Diego, CA (US); Dennis Z. Guo, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 707 days.

(21) Appl. No.: 16/499,659

(22) PCT Filed: Jul. 5, 2017

(86) PCT No.: PCT/US2017/040692
§ 371 (c)(1),
(2) Date: Sep. 30, 2019

(87) PCT Pub. No.: WO2019/009888
PCT Pub. Date: Jan. 10, 2019

(65) Prior Publication Data
US 2020/0115569 A1 Apr. 16, 2020

(51) Int. Cl.
| | |
|---|---|
| C09D 11/023 | (2014.01) |
| C09D 11/03 | (2014.01) |
| C09D 11/037 | (2014.01) |
| C09D 11/107 | (2014.01) |
| C09D 11/322 | (2014.01) |
| C09D 125/08 | (2006.01) |
| C09D 133/08 | (2006.01) |
| C09D 133/10 | (2006.01) |
| C09D 133/26 | (2006.01) |
| C08K 5/23 | (2006.01) |
| C09B 29/33 | (2006.01) |

(52) U.S. Cl.
CPC ............. *C09D 11/023* (2013.01); *C08K 5/23* (2013.01); *C08K 5/235* (2013.01); *C09B 29/331* (2013.01); *C09D 11/03* (2013.01); *C09D 11/037* (2013.01); *C09D 11/107* (2013.01); *C09D 11/322* (2013.01); *C09D 125/08* (2013.01); *C09D 133/08* (2013.01); *C09D 133/10* (2013.01); *C09D 133/26* (2013.01)

(58) Field of Classification Search
None
See application file for complete search history.

(56) References Cited

U.S. PATENT DOCUMENTS

| | | | |
|---|---|---|---|
| 4,461,647 A * | 7/1984 | Schofield | ............ C09B 67/0041 106/494 |
| 7,635,504 B2 | 12/2009 | Elwakil et al. | |
| 8,048,213 B2 | 11/2011 | Shakhnovich | |
| 9,109,127 B2 | 8/2015 | Shimohara et al. | |
| 2007/0002111 A1 | 1/2007 | Roh et al. | |
| 2007/0215008 A1* | 9/2007 | Schweikart | .......... C09D 17/003 106/499 |
| 2012/0232199 A1* | 9/2012 | Idemura | .............. C09B 67/0066 524/190 |
| 2014/0043398 A1* | 2/2014 | Butler | .................. B41J 2/14427 524/502 |
| 2014/0313268 A1 | 10/2014 | Nakano et al. | |
| 2017/0114235 A1 | 4/2017 | De Mondt et al. | |

FOREIGN PATENT DOCUMENTS

| | | |
|---|---|---|
| CA | 2800256 | 10/2011 |
| JP | S56166266 | 12/1981 |
| JP | 2004182952 A | 7/2004 |
| TW | 201022368 A | 6/2010 |
| WO | 2010104210 A1 | 9/2010 |
| WO | WO-2017063968 A1 | 4/2017 |

\* cited by examiner

*Primary Examiner* — Vu A Nguyen
(74) *Attorney, Agent, or Firm* — HP Inc. Patent Department

(57) ABSTRACT

In one aspect the present disclosure relates to an aqueous inkjet ink composition comprising a yellow azo pigment, a pigment synergist, a polymeric dispersant, 5 to 20 wt % of a latex polymer, 5 to 40 wt % of an organic co-solvent that has a boiling point of a boiling point in the range of about 170° C. to about 285° C., and water. The pigment synergist comprises a pigment of the formula (I):

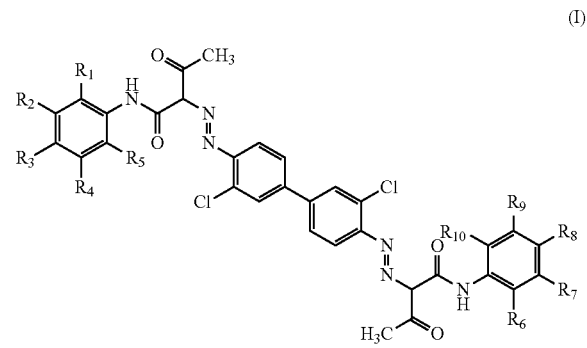

where each of $R_1$ to $R_{10}$ is each independently selected from H, carboxylate, and/or a sulphonate group.

20 Claims, No Drawings

INKJET INK COMPOSITION

CROSS-REFERENCE TO RELATED APPLICATIONS

This Utility patent application is a U.S. National Stage filing under 35 U.S.C. § 371 of PCT/US2017/040692, filed Jul. 5, 2017, incorporated by reference herein.

BACKGROUND

Inkjet printing may be used for paper and other porous ink adsorptive media. More recently, inkjet printing has been extended to non-porous non-adsorptive media. Unlike paper-based media, these media are often used for high durability applications (e.g. vehicle graphics), and require inks with high image durability and weatherability. Inks designed for nonporous media are substantially different than traditional inks designed for paper and other porous media. On paper, ink penetration into the media can assist with drying, and the ultimate image durability may be limited by the durability of the media. In contrast, on nonporous media, there may be little or no penetration of the ink into the media, and drying is evaporative, leaving the deposited colorant on the surface of the media, without the protection of a porous media matrix.

For high durability applications, latex polymers may be included in inkjet ink compositions to bind the colorant to the print media's surface. A latex ink composition may be deposited on a media surface and heated to remove water from the ink composition to allow the latex component to be cured. Thus, the latex component may form a film on a media surface, entrapping and protecting the colorant within the film.

DETAILED DESCRIPTION

Before the latex polymers, ink compositions and related aspects of the disclosure are disclosed and described, it is to be understood that this disclosure is not restricted to the particular process features and materials disclosed because such process features and materials may vary. It is also to be understood that the terminology employed is used for the purpose of describing particular examples. It is noted that, as used in this specification and the appended claims, the singular forms "a," "an," and "the" include plural forms unless the context clearly dictates otherwise.

As used in the present disclosure, "co-polymer" refers to a polymer that is polymerized from at least two monomers.

A certain monomer may be described in the present disclosure as constituting a certain weight percentage of a polymer. This indicates that the repeating units formed from the said monomer in the polymer constitute said weight percentage of the polymer.

If a standard test is mentioned, unless otherwise stated, the version of the test to be referred to is the most recent at the time of filing this patent application.

As used in the present disclosure, the term "about" is used to provide flexibility to a numerical range endpoint by providing that a given value may be a little above or a little below the endpoint. The degree of flexibility of this term can be dictated by the particular variable.

As used in the present disclosure, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle.

The term "monomer emulsion" refers to an organic monomer or monomer mix that is emulsified in an aqueous or water phase. Once the organic monomer or monomer mix is polymerized, a latex polymer dispersion is formed.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 500 nm (preferably from 100 nm to 300 nm) in size (average particle size), and having a weight average molecular weight from about 10,000 Mw to 2,000,000 Mw (preferably from about 100,000 Mw to 300,000 Mw). Such polymeric particulates can comprise a plurality of monomers that are typically randomly polymerized, and can also be crosslinked. When crosslinked, the molecular weight can be higher than that cited above. The average particle size (e.g. volume or intensity weighted average particle size) may be determined by dynamic light scattering.

The term "non-porous" when referring to a substrate, such as a media substrate, includes surfaces that can have relatively poor water permeability and absorption. Vinyl, polypropylene, polyethylene and other plastic sheets or films, metals, coated offset media, glass, and other similar substrates are considered to be non-porous. By way of comparison, substrates such as paper and cardboard may be regarded as "porous".

Low energy surface media include polyolefinic media (polypropylene or polyethylene). These media may be modified to facilitate wetting by inks (e.g. aqueous inkjet inks); This modification may increase the surface energy, but relative to other substrates they may remain 'low'. Surface energy, for example surface energy with respect to aqueous inks, may be measured by contact angle between the substrate and water. In some examples, a low energy surface media is a media (i.e. print substrate) having a surface energy of less than about 40 dyne/cm, for example less than about 35 dyne/cm. The surface energy of a print substrate may be measured according to ASTM D2578.

As used in the present disclosure, "ink vehicle" refers to the liquid in which a latex polymer and a pigment are placed to form an ink. Ink vehicles may include a mixture of a variety of different agents, including, for example, surfactants, solvents, co-solvents, buffers, biocides, viscosity modifiers, sequestering agents, stabilizing agents, humectants and water.

The term "decap" is a measure of how long a printing nozzle may remain inactive before plugging and how many inkjet architecture firings are required to re-establish proper drop ejection.

The term "(meth)acrylate" is well understood in the art to refer to both acrylates and methacrylates. For example, "cyclohexyl (meth)acrylate" refers to cyclohexyl acrylate and/or cyclohexyl methacrylate. Likewise, the term "cycloaliphatic (meth)acrylate monomer" denotes a cycloaliphatic acrylate monomer and/or a cycloaliphatic methacrylate monomer; and the term "aromatic(meth)acrylate monomer" denotes an aromatic acrylate monomer and/or an aromatic methacrylate monomer.

The term "(meth)acrylamide" is well understood in the art to refer to both acrylamides and methacrylamides. For example, the term "cycloaliphatic (meth)acrylamide monomer" denotes a cycloaliphatic acrylamide monomer and/or a cycloaliphatic methacrylamide monomer; and the term "aromatic (meth)acrylamide monomer" denotes an aromatic acrylamide monomer and/or an aromatic methacrylamide monomer.

The term "carboxylate" refers to dissociated or un-dissociated forms of carboxylate. Accordingly, the term may be used to include carboxylate anion, carboxylate salt and/or carboxylic acid groups. The term "sulphonate" refers to dissociated or un-dissociated forms of sulphonate. Accordingly, the term may be used to include sulphonate anion, sulphonate salt and/or sulphonic acid groups.

As used in the present disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described in the present disclosure can be combined with any aspect or any other feature described in the present disclosure.

In one aspect the present disclosure relates to an aqueous inkjet ink composition comprising a yellow azo pigment, a pigment synergist, a polymeric dispersant, 5 to 20 wt % of a latex polymer, 5 to 40 wt % of an organic co-solvent that has a boiling point of a boiling point in the range of about 170° C. to about 285° C., and water.

The pigment synergist comprises a pigment of the formula (I):

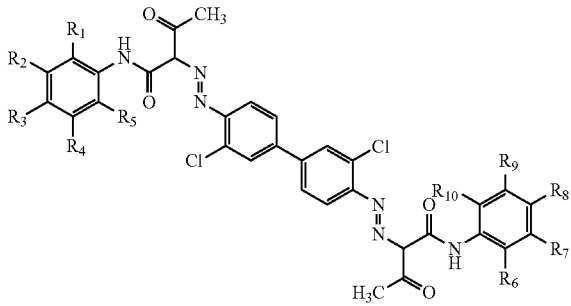

(I)

where each of $R_1$ to $R_{10}$ is each independently selected from H, carboxylate, and/or a sulphonate group.

In some examples, the aqueous inkjet ink composition may comprise Pigment Yellow 155; the pigment synergist comprising the compound of Formula (I) above; a polymeric dispersant; 5 to 20 weight % of a latex polymer; 5 to 40 wt % of an organic co-solvent that has a boiling point of a boiling point in the range of about 170° C. to about 285° C.; and water.

In some examples, the aqueous inkjet ink composition may comprise Pigment Yellow 155; the pigment synergist comprising the compound of Formula (I) above; styrene acrylic polymeric dispersant; 5 to 20 wt % of a latex polymer; 5 to 40 wt % of an organic co-solvent that has a boiling point of a boiling point in the range of about 170° C. to about 285° C.; and water.

In some examples, the aqueous inkjet ink composition may comprise Pigment Yellow 155; the pigment synergist comprising the compound of Formula (I) above; polymeric dispersant (e.g. a styrene acrylic polymeric dispersant); 5 to 20 wt % of a latex polymer; 5 to 40 wt % of an organic co-solvent comprising a pyrrolidinone, diol and/or a glycol ether, wherein said pyrrolidinone, diol and/or said glycol ether has a boiling point of a boiling point in the range of about 170° C. to about 285° C.; and water.

The high durability, inkjet printhead reliability, and drying requirements of latex inks can pose challenges. Since high solvent levels are often required for printhead nozzle reliability with latex inks, the shelf-life stability of the pigmented colorants may be an issue, since high solvent loadings can impact the colloidal stability of pigment dispersions. This can result in pigment aggregation and lead to performance issues including, for example, colorant settling and nozzle clogging.

Polymer dispersants may be included in the inkjet ink for pigment dispersion. Certain polymer dispersants, however, can affect the durability of the ink. Moreover, even in the presence of polymer dispersants, the pigment particles can still agglomerate under certain conditions, particularly, for example, if surfactants are included in the inkjet ink to improve the ink's wetting properties. Agglomeration may cause the viscosity of the ink to increase and this, in turn, may affect the jettability and decap properties of the inkjet ink.

It has been found that a polymer synergist of the Formula I may be used in combination with a polymer dispersant to stabilise a yellow azo pigment in an inkjet ink composition comprising 5 to 20 wt % of a latex polymer, 5 to 40 wt % of an organic co-solvent that has a boiling point of a boiling point in the range of about 170° C. to about 285° C., and water. The resulting composition may also be used to provide stable images on, for example, non-porous print media.

The inkjet ink composition may have a solids content of 5 to 30 wt %, for example, 10 to 25 wt % or 15 to 20 wt %.

The inkjet ink composition may additionally comprise a surfactant, for example, in an amount of 0.01 to 3 wt %. In some examples, the inkjet ink composition may comprise 0.1 to 2 wt %, for instance, 0.5 to 1.5 wt % surfactant.

The inkjet ink composition may have a pH of 5 to 10, for example, pH 8 to 8.5.

Pigment Synergist

The pigment synergist comprises a pigment of the formula (I). For the avoidance of doubt, the pigment of the formula (I) is provided in addition to the yellow azo pigment of the inkjet ink composition.

The pigment of Formula I is:

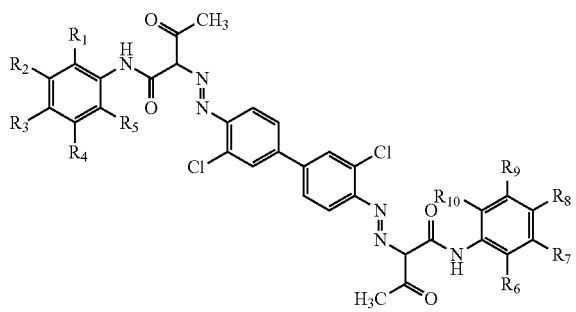

where each of $R_1$ to $R_{10}$ is each independently selected from H, a carboxylate group, and/or a sulphonate group.

At least one of $R_1$ to $R_{10}$ may be a carboxylate, and/or sulphonate group. In some examples, not all of $R_1$ to $R_{10}$ may be a carboxylate and/or sulphonate group so that the remaining $R_1$ to $R_{10}$ are hydrogen.

In some examples, at least one of $R_1$ to $R_5$ may be a carboxylate and/or sulphonate group. In some examples, at least one of $R_6$ to $R_{10}$ may be a carboxylate and/or sulphonate group. In some examples, at least one (e.g. 1, 2, 3 or 4) of $R_1$ to $R_5$ may be a carboxylate group and/or sulphonate group and the remainder of $R_1$ to $R_5$ may be H, and at least one (e.g. 1, 2, 3 or 4) of $R_6$ to $R_{10}$ may be a carboxylate and/or sulphonate group and the remainder of $R_6$ to $R_{10}$ may be H. In some examples, 1 or 2 of $R_1$ to $R_5$ may be a carboxylate group and/or sulphonate group and the remainder of $R_1$ to $R_5$ may be H, and 1 or 2 of $R_6$ to $R_{10}$ may be a carboxylate and/or sulphonate group and the remainder of $R_6$ to $R_{10}$ may be H.

In some examples, at least one (e.g. 1, 2, 3 or 4) of $R_1$ to $R_5$ may be a sulphonate group the remainder of $R_1$ to $R_5$ may be H, and at least one (e.g. 1, 2, 3 or 4) of $R_6$ to $R_{10}$ may be a sulphonate group the remainder of $R_1$ to $R_5$ may be H.

In some examples, the pigment synergist comprises Pigment Yellow 12 or a sulphonated or carboxylated derivative thereof. In some examples, the pigment synergist comprises a sulphonated derivative of Pigment Yellow 12.

The pigment synergist may also comprise a precipitating agent. The precipitating agent may serve to precipitate or insolubilize the compound of the Formula I. The precipitating agent may be a metal compound. Examples of suitable metals include alkaline earth metals, for instance, magnesium, calcium, strontium and barium. Other metals include Group 13 metals, for instance, aluminium. In some examples, the metal is selected from calcium, barium and aluminium. The metal compound may be an oxide, carbonate, nitrate, sulphate, and/or a halide. In one example, the metal compound may be aluminium oxide, or aluminium nitrate.

The pigment synergist may comprise 6000 to 50000 ppm metal, for example, 12000 to 30000 ppm metal.

The inkjet ink composition may comprise 3 to 30 ppm metal, for example, 6 to 12 ppm metal from the pigment synergist.

The weight ratio of precipitating agent to compound of Formula I may be 2:98 to 40:60, for example 5:95 to 25:75.

Suitable pigment synergists may be available under the trademarks Solsperse® 22000 (Lubrizol®) and BYK-Synergist 2105 (ALTANA® Group).

The pigment synergist may be present in an amount of 0.1 to 5 wt % of the total weight of the inkjet ink composition.

In some examples, the pigment synergist may be present in an amount of 0.1 to 3 wt %, for example, 0.2 to 2 wt % or 0.3 to 1 wt % of the total weight of the inkjet ink composition.

The weight ratio of pigment synergist to the yellow azo pigment (e.g. Pigment Yellow 155) may be 0.5:99.5 to 10:90, for example, 1:99 to 8:92. In some examples, the ratio may be 2:98 to 6:94, for example, 2:98 to 5:95.

The weight ratio of yellow azo pigment (e.g. Pigment Yellow 155) to polymer dispersant may be 96:4 to 60:40, for example, 92:8 to 65:35. In some examples, the ratio may be 90:10 to 70:30, for example, 85:15 to 75:25.

Polymer Dispersant

Any suitable polymeric dispersant may be used. They may be block, random or graft copolymers.

Suitable examples of monomers for synthesising polymeric dispersants include: acrylic acid, methacrylic acid, maleic acid (or their salts), maleic anhydride, alkyl(meth) acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth) acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g., oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidil ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth) acrylamide; maleimides such as N-phenyl maleimide; vinyl derivatives such as vinyl alcohol, vinyl caprolactam, vinyl pyrrolidone, vinyl imidazole, vinyl naphthalene, and vinyl halides; vinyl ethers such as vinyl methyl ether; vinyl esters of carboxylic acids such as vinyl acetate, vinyl butyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/ methacrylic acid/acrylic ester copolymer, styrene/α-methylstyrene/acrylic acid copolymer, styrene/α-methylstyrene/ acrylic acid/acrylic ester copolymer, styrene/maleic acid copolymer, styrene/maleic anhydride copolymer, vinyl naphthalene/acrylic acid copolymer, vinyl naphthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

In some examples, the polymer dispersant may be a styrene acrylic resin. The styrene acrylic resin may have a molecular weight in the range of 500 to 30000, for example, 6000 to 18000. The styrene acrylic resin may have an acid number of 100 to 300, for example, 120 to 220 mg KOH/g. The styrene acrylic resin may be solid at room temperature. For example, the styrene acrylic resin may have a $T_g$ of 10 to 150 degrees C.

In some examples, the styrene acrylic resin may be Joncryl 683 (supplied by BASF) or Joncryl® 671 (supplied by BASF).

The polymer dispersant may be present in an amount of 0.1 to 2.5 wt %, for example, 0.3 to 1 wt % of the inkjet ink composition.

Latex Polymer

The inkjet ink composition comprises a latex polymer.

Latex polymers can be prepared using any of a number of methods known in the art, including but not limited to emulsion polymerization techniques where co-monomers are dispersed and polymerized in a discontinuous phase of an emulsion. The latexes can also be dispersions of polymer prepared by other techniques known to those in the art.

The monomers used in the latexes can be vinyl monomers. In some examples, the monomers from which the latex polymer is formed are selected from vinyl monomers, acrylate monomers, methacrylate monomers, styrene monomers, ethylene, vinyl chloride, vinylidene chloride, maleate esters, fumarate esters, itaconate esters and combinations thereof. In some examples, monomers from which the latex polymer is formed may comprise ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; iso-octyl methacrylate; and combinations thereof.

In some examples, the latex polymer is formed from monomers selected from styrenes, C1 to C8 alkyl methacrylates, C1 to C8 alkyl acrylates, ethylene glycol methacrylates and dimethacrylates, methacrylic acids, acrylic acids, and combinations thereof. Examples of latex polymers that can be used include those prepared using a monomer emulsion of styrene, hexyl methacrylate, ethylene glycol dimethacrylate, and methacrylic acid, which are copolymerized to form the latex.

In some examples, the monomers from which the latex polymer is formed include acid monomers, such as (meth) acrylic acid monomers. Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

In some examples, the latex polymer comprises a (meth)acrylate or (meth)acrylamide polymer or copolymer. In some examples, the latex polymer comprises a (meth)acrylate or (meth)acrylate copolymer. A (meth)acrylate or (meth)acrylamide copolymer may contain a (meth)acrylate/(meth)acrylamide component in addition to other components, such as other vinyl monomer components. For example, the latex polymer may comprise a copolymer of a (meth)acrylate monomer and another vinyl monomer, for example another vinyl monomer selected from styrenes, C1 to C8 alkyl methacrylates, C1 to C8 alkyl acrylates, ethylene glycol methacrylates and dimethacrylates, methacrylic acids, acrylic acids, and combinations thereof. For example, the latex polymer may comprise a copolymer of a (meth)acrylamide monomer and another vinyl monomer, for example another vinyl monomer selected from styrenes, C1 to C8 alkyl methacrylates, C1 to C8 alkyl acrylates, ethylene glycol methacrylates and dimethacrylates, methacrylic acids, acrylic acids, and combinations thereof.

In some examples, the latex polymer comprises a (meth)acrylate polymer being a polymer comprising (meth)acrylate monomers or a (meth)acrylate copolymer being a copolymer comprising (meth)acrylate monomers. In some examples, the latex polymer comprises a (meth)acrylate copolymer comprising (meth)acrylate monomers.

In some examples, the (meth)acrylate monomers are selected from aliphatic (meth)acrylate monomers, aromatic (meth)acrylate monomers and combinations thereof.

In some examples, aliphatic (meth)acrylate monomers comprise linear aliphatic (meth)acrylate monomers and/or cycloaliphatic (meth)acrylate monomers.

In some examples, linear (meth)acrylate monomers comprise alkyl (meth)acrylate monomers (for example C1 to C8 alkyl (meth)acrylate monomers). In some examples, the linear (meth)acrylate monomers comprise alkyl methacrylate monomers (e.g. C1 to C8 alkyl methacrylate monomers). In some examples, the linear (meth)acrylate monomers comprise alkyl methacrylate monomers (e.g. C1 to C8 alkyl methacrylate monomers) and alkyl acrylate monomers (C1 to C8 alkyl acrylate monomers).

In some examples, the latex polymer comprises a copolymer comprising alkyl (meth)acrylate (e.g. C1 to C8 alkyl (meth)acrylate monomers) and styrene monomers. In some examples, the latex polymer comprises a copolymer comprising alkyl (meth)acrylate (e.g. C1 to C8 alkyl (meth) acrylate monomers), styrene monomers and (meth)acrylic acid monomers.

In some examples, the latex polymer comprises a (meth)acrylamide polymer being a polymer comprising (meth)acrylamide monomers or a (meth)acrylamide copolymer being a copolymer comprising (meth)acrylamide monomers. In some examples, the latex polymer comprises a (meth)acrylamide copolymer comprising (meth)acrylamide monomers.

In some examples, the (meth)acrylamide monomers are selected from aliphatic (meth)acrylamide monomers, aromatic (meth)acrylamide monomers and combinations thereof.

In some examples, aliphatic (meth)acrylamide monomers comprise linear aliphatic (meth)acrylamide monomers and/or cycloaliphatic (meth)acrylamide.

In some examples, linear (meth)acrylamide monomers comprise alkyl (meth)acrylamide monomers (for example C1 to C8 alkyl (meth)acrylamide monomers). In some examples, the linear (meth)acrylamide monomers comprise alkyl methacrylamide monomers (e.g. C1 to C8 alkyl methacrylamide monomers). In some examples, the linear (meth)acrylamide monomers comprise alkyl methacrylamide monomers (e.g. C1 to C8 alkyl methacrylamide monomers) and alkyl acrylamide monomers (C1 to C8 alkyl acrylamide monomers).

In some examples, the latex polymer comprises a copolymer comprising alkyl (meth)acrylamide (e.g. C1 to C8 alkyl (meth)acrylamide) and styrene monomers. In some examples, the latex polymer comprises a copolymer comprising alkyl (meth)acrylamide (e.g. C1 to C8 alkyl (meth)acrylamide monomers), styrene monomers and (meth)acrylic acid monomers.

In some examples, the latex polymer comprises a copolymer comprising cycloaliphatic (meth)acrylate monomers or cycloaliphatic (meth)acrylamide monomers.

The present inventors have found that employing a latex polymer comprising cycloaliphatic (meth)acrylate or (meth)acrylamide monomers in the inkjet ink compositions described in the present disclosure provides further improvements regarding the curing of the latex polymers on, and adhesion to, a wide range of print substrates.

In some examples, the latex polymer comprises a copolymer comprising aromatic (meth)acrylate monomers or aromatic (meth)acrylamide monomers.

The terms 'cycloaliphatic' and 'aromatic' are well understood by the skilled person.

In some examples, the latex polymer is derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer. For example; the latex polymer may comprise a copolymer of a cycloaliphatic monomer and an aromatic monomer, wherein the cycloaliphatic monomer comprises one or more monomers comprising a cycloaliphatic (meth)acrylate monomer or a cycloaliphatic (meth)acrylamide monomer, and the aromatic monomer comprises one or more monomers comprising an aromatic (meth)acrylate monomer or an aromatic (meth)acrylamide monomer. For example, the latex polymer may comprise a copolymer comprising cycloaliphatic monomer units (e.g. cycloaliphatic (meth)acrylate and/or cycloaliphatic (meth)acrylamide units) and aromatic monomer units (e.g. aromatic (meth)acrylate and/or aromatic (meth)acrylamide units).

A latex polymer comprising a copolymer comprising cycloaliphatic monomers (such as cycloaliphatic (meth)acrylate or (meth)acrylamide monomers) in combination aromatic monomers (such as aromatic (meth)acrylate or (meth)acrylamide monomers) in the inkjet ink compositions described in the present disclosure may provide further improvements regarding the curing of the latex polymers on, and adhesion to, a wide range of print substrates.

In some examples, the cycloaliphatic monomer comprises a cycloaliphatic (meth)acrylate monomer or a cycloaliphatic (meth)acrylamide monomer. In some examples, the cycloaliphatic monomer comprises a cycloaliphatic (meth)acrylate monomer. A cycloaliphatic (meth)acrylate monomer is a monomer comprising a cycloaliphatic moiety bonded to, either directly or indirectly, a (meth)acrylate moiety (e.g. by a carbon chain; for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen). In some examples, the cycloaliphatic monomer comprises a cycloaliphatic (meth)acrylamide monomer. A cycloaliphatic (meth)acrylamide monomer is a monomer comprising a cycloaliphatic moiety bonded to, either directly or indirectly, a (meth)acrylamide moiety (e.g. by a carbon chain, for example a saturated or unsaturated carbon chain, such as a $C_{1-12}$ carbon chain, for example a substituted or unsubstituted carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen).

In some examples, the cycloaliphatic moiety comprises a 5-12 membered aliphatic ring, for example a carbon ring having 5-12 carbon atoms (e.g. a $C_5$-$C_{12}$ ring), or a 5-12 membered heteroaliphatic ring. In some examples, the cycloaliphatic moiety comprises a $C_5$-$C_{12}$ ring, a $C_5$-$C_{12}$ ring may be a single ring (such as cyclopentyl, cyclohexyl or cycloheptyl groups) or a bicyclic ring (such as decalin). In some examples, the cycloaliphatic moiety comprises a 5-10 membered aliphatic ring, for example a 6-10 membered aliphatic ring.

In some examples, the cycloaliphatic moiety comprises a carbon ring having 5-10 carbon atoms (e.g. a $C_5$-$C_{10}$ ring). In some examples, the cycloaliphatic moiety comprises a carbon ring having 6-10 carbon atoms (e.g. a $C_6$-$C_{10}$ ring).

In some examples, the cycloaliphatic moiety comprises a substituent, such as an alkyl, heteroalkyl, alkoxy, hydroxyl, cycloaliphatic or aromatic substituent. In some examples, the cycloaliphatic moiety comprises a substituent, such as an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether). In some examples, the cycloaliphatic moiety is an optionally substituted cycloaliphatic moiety, for example optionally substituted with a $C_{1-12}$ alkyl group.

In some examples, the aromatic monomer comprises an aromatic (meth)acrylate monomer or an aromatic (meth)acrylamide monomer. In some examples, the aromatic monomer comprises an aromatic (meth)acrylate monomer. An aromatic (meth)acrylate monomer is a monomer comprising an aromatic moiety bonded to, either directly or indirectly, a (meth)acrylate moiety (e.g. by a carbon chain, for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen). In some examples, the aromatic monomer comprises an aromatic (meth)acrylamide monomer. An aromatic (meth)acrylamide monomer is a monomer comprising an aromatic moiety bonded to, either directly or indirectly, a (meth)acrylamide moiety (e.g. by a carbon chain; for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen).

In some examples, the aromatic moiety comprises a 5-12 membered aromatic ring, for example an aromatic carbon ring having 6-12 carbon atoms (e.g. a $C_6$-$C_{12}$ ring), or a 5-12 membered heteroaromatic ring. In some examples, the aromatic moiety comprises a $C_5$-$C_{12}$ aromatic ring, a $C_5$-$C_{12}$ aromatic ring may be a single aromatic ring (e.g. benzyl or phenyl), or a bicyclic aromatic ring (e.g. naphthyl). In some examples, the aromatic moiety comprises a 5-10 membered aromatic ring, for example a 6-10 membered aromatic ring.

In some examples, the aromatic moiety comprises an aromatic carbon ring having 6-10 carbon atoms (e.g. a $C_6$-$C_{10}$ aromatic ring).

In some examples, the aromatic moiety comprises a substituent, such as an alkyl, heteroalkyl (including an ether containing group), alkoxy, hydroxyl, cycloaliphatic or aromatic substituent. In some examples, the aromatic moiety comprises a substituent. In some examples, the aromatic moiety may be substituted by an alkyl group, (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether). In some examples, the aromatic moiety is optionally substituted, for example optionally substituted with a $C_{1-12}$ alkyl group.

In some example, the cycloaliphatic monomer is a cycloaliphatic monomer having the formula (I)

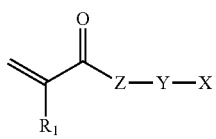

formula (I)

wherein,
$R_1$ is H or methyl;
Z is O or $NR_2$, where $R_2$ is H, alkyl or X';
Y is a bond or a carbon chain, where one or more of the carbon atoms of the carbon chain may be replaced with a heteroatom such as oxygen, sulfur or nitrogen;
X and X' are independently cycloaliphatic moieties.

In some examples $R_2$ is alkyl, for example $C_{1-12}$, $C_{1-10}$, $C_{1-6}$, or $C_{1-4}$ alkyl (e.g. methyl or ethyl). In some examples $R_2$ is an optionally substituted alkyl group. In some examples $R_2$ is H, an optionally substituted alkyl group or X'. In some examples, $R_2$ is H or X'. In some examples, $R_2$ is H.

In some examples, Y is a bond or a saturated or unsaturated carbon chain. In some examples Y is a bond or a $C_{1-12}$, for example $C_{1-10}$, $C_{1-6}$, or $C_{1-4}$ carbon chain. In some examples, one or more of the carbon atoms of the carbon chain represented by Y is replaced with a heteroatom selected from oxygen, sulfur and nitrogen. In some examples, Y is a bond.

In some examples, X is a 5-12 membered ring, for example a carbon ring having 5-12 carbon atoms (e.g. a $C_5$-$C_{12}$ ring), or a 5-12 membered heteroaliphatic ring. In some examples, X is a $C_5$-$C_{12}$ single ring (such as cyclopentyl, cyclohexyl or cycloheptyl groups) or a bicyclic ring (such as decalin).

In some examples, X is a carbon ring having 5-10 carbon atoms (e.g. a $C_5$-$C_{10}$ ring). In some examples, X is a carbon ring having 6-10 carbon atoms (e.g. a $C_6$-$C_{10}$ ring).

In some examples, X is substituted, for example with an alkyl, alkoxy, hydroxyl, heteroalkyl, cycloaliphatic or aromatic substituent. In some examples, X is substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether). In some examples, X is optionally substituted, for example optionally substituted with a $C_{1-12}$ alkyl group.

In some examples, X' is a carbon ring having 5-12 carbon atoms (e.g. a $C_5$-$C_{12}$ ring), or a 5-12 membered heteroaliphatic ring. In some examples, X' is a $C_5$-$C_{12}$ single ring (such as cyclopentyl, cyclohexyl or cycloheptyl groups) or a bicyclic ring (e.g. a $C_6$ or $C_{10}$ fused ring, such as decalin).

In some examples, X' is a carbon ring having 5-10 carbon atoms (e.g. a $C_5$-$C_{10}$ ring). In some examples, X' is a carbon ring having 6-10 carbon atoms (e.g. a $C_6$-$O_{10}$ ring).

In some examples, X' is substituted, for example with an alkyl, alkoxy, hydroxyl, heteroalkyl, cycloaliphatic or aromatic substituent. In some examples, X' is substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether). In some examples, X' is optionally substituted, for example optionally substituted with a $C_{1-12}$ alkyl group.

In some examples, for example when Z is $NR_2$ and $R_2$ is X', X and X' may be the same.

Examples of cycloaliphatic monomers include: cyclohexyl acrylate, cyclohexyl methacrylate, methylcyclohexyl acrylate, methylcyclohexyl methacrylate, trimethylcyclohexyl acrylate, trimethylcyclohexyl methacrylate, and other cycloaliphatic methacrylate and acrylate monomers including ester derivatives of decalinol, hydrogenated bisphenol A and F. In some examples, the latex polymer comprises at least about 50 wt % cycloaliphatic monomers by total weight solids of the latex polymer, for example at least about 55 wt %, or at least about 60 wt % cycloaliphatic monomers by total weight solids of the latex polymer.

In some examples, the latex polymer comprises up to about 95 wt % cycloaliphatic monomers by total weight solids of the latex polymer, for example up to about 90 wt % cycloaliphatic monomers by total weight solids of the latex polymer.

In some examples, the latex polymer comprises from about 50 wt % to about 90 wt %, for example from about 60 wt % to about 90 wt % cycloaliphatic monomers by total weight solids of the latex polymer.

In some example, the aromatic monomer is an aromatic monomer having the formula (II)

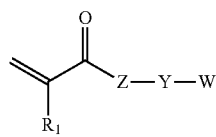

formula (II)

wherein, $R_1$ is H or methyl;

Z is O or $NR_2$, where $R_2$ is H, alkyl or W';

Y is a bond or a carbon chain, where one or more of the carbon atoms of the carbon chain may be replaced with a heteroatom such as oxygen, sulfur or nitrogen;

W and W' are independently aromatic moieties.

In some examples $R_2$ is alkyl, for example $C_{1-12}$, C1-10, $C_{1-6}$, or $C_{1-4}$ alkyl (e.g. methyl or ethyl). In some examples $R_2$ is an optionally substituted alkyl group. In some examples $R_2$ is H, an optionally substituted alkyl group or W'. In some examples, $R_2$ is H or W'. In some examples, $R_2$ is H.

In some examples, Y is a bond or a saturated or unsaturated carbon chain. In some examples Y is a bond or a $C_{1-12}$, for example $C_{1-10}$, $C_{1-6}$, or $C_{1-4}$ carbon chain. In some examples, one or more of the carbon atoms of the carbon chain represented by Y is replaced with a heteroatom selected from oxygen, sulfur and nitrogen. In some examples, Y is a bond.

In some examples, W is a 5-12 membered aromatic ring, for example a carbon ring having 6-12 carbon atoms (e.g. a $C_6$-$C_{12}$ aromatic ring), or a 5-12 membered heteroaromatic ring. In some examples W comprises a $C_5$-$C_{12}$ aromatic ring, a $C_5$-$C_{12}$ aromatic ring may be a single aromatic ring (e.g. benzyl or phenyl) or a bicyclic aromatic ring (e.g. a fused C6 or C10 aromatic ring, e.g. naphthyl). In some examples, W is a 5-10 membered aromatic ring, for example a 6-10 membered aromatic ring.

In some examples, W is an aromatic carbon ring having 6-10 carbon atoms (e.g. a $C_6$-$C_{10}$ aromatic ring).

In some examples, W is substituted, for example W may be substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ ether). In some examples, W is optionally substituted, for example optionally substituted with a $C_{1-12}$ alkyl group.

In some examples, W' is a 5-12 membered aromatic ring, for example a carbon ring having 6-12 carbon atoms (e.g. a $C_6$-$C_{12}$ aromatic ring), or a 5-12 membered heteroaromatic ring. In some examples W' comprises a $C_6$-$C_{12}$ aromatic ring, a $C_6$-$C_{12}$ aromatic ring may be a single aromatic ring (e.g. benzyl or phenyl) or a bicyclic aromatic ring (e.g. a fused C6 or C10 aromatic ring, e.g. naphthyl). In some examples, W' is a 5-10 membered aromatic ring, for example a 6-10 membered aromatic ring.

In some examples, W' is an aromatic carbon ring having 6-10 carbon atoms (e.g. a $C_6$-$C_{10}$ aromatic ring).

In some examples, W' is substituted, for example W' may be substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ ether). In some examples, W' is optionally substituted, for example optionally substituted with a $C_{1-12}$ alkyl group.

In some examples, for example when Z is $NR_2$ and $R_2$ is W', W and W' may be the same.

Examples of aromatic monomers include: 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, N-benzyl methacrylate, N-benzyl acrylate, N,N-diphenyl methacrylamide, N,N-diphenyl acrylamide, naphthyl methacrylate, naphthyl acrylate, phenyl methacrylate and phenyl acrylate.

In some examples, the latex polymer comprises at least about 1 wt % aromatic monomers by total weight solids of the latex polymer, for example at least about 2 wt %, or at least about 5 wt % aromatic monomers by total weight solids of the latex polymer.

In some examples, the latex polymer comprises up to about 35 wt % aromatic monomers by total weight solids of the latex polymer, for example up to about 30 wt %, up to about 25 wt %, or up to about 20 wt % aromatic monomers by total weight solids of the latex polymer.

In some examples, the latex polymer comprises from about 1 wt % to about 35 wt % aromatic monomers by total weight solids of the latex polymer, for example from about 2 wt % to about 30 wt %, or about 5 wt % to about 25 wt % aromatic monomers by total weight solids of the latex polymer.

In some examples, the composition from which the latex polymer is derived further comprises an alkyl meth(acrylate). In some examples, the composition from which the latex polymer is derived comprises an alkyl methacrylate monomer. In some examples, the composition from which the latex polymer is derived comprises an alkyl acrylate monomer. In some examples, the composition from which the latex polymer is derived comprises an alkyl acrylate monomer and an alkyl methacrylate monomer. In some examples, the alkyl (meth)acrylate may be a $C_{1-8}$ alkyl (meth)acrylate.

In some examples, the latex polymer comprises an alkyl meth(acrylate) component. In some examples, the latex polymer further comprises an alkyl methacrylate component. In some examples, the latex polymer further comprises an alkyl acrylate component. In some examples, the latex polymer further comprises an alkyl acrylate component and an alkyl methacrylate component.

In some examples, the latex polymer comprises from about 0 wt % to about 10 wt %, for example from about 0.1 wt % to about 10 wt % of an alkyl meth(acrylate), for example methyl methacrylate.

In some examples, the latex polymer comprises a copolymer formed from an alkyl meth(acrylate) monomer, a cycloaliphatic monomer and an aromatic monomer. In some examples, the latex polymer comprises a copolymer formed from an alkyl meth(acrylate) monomer, (meth)acrylic acid, a cycloaliphatic monomer and an aromatic monomer. In some examples, the latex polymer comprises a copolymer formed from a (meth)acrylic acid, a cycloaliphatic monomer and an aromatic monomer.

In some examples, the composition from which the latex polymer is derived further comprises an acid monomer, for example (meth)acrylic acid monomers or carboxylic acid monomers. In some examples, the composition from which the latex polymer is derived further comprises (meth)acrylic acid. For example, the composition may comprise (meth)acrylic acid in an amount of 0 wt % to about 15 wt %, about 0.1 wt % to about 15 wt %, for example, about 0.25 wt % to about 10 wt %, or about 0.25 wt % to about 6 wt %. In some examples, the composition from which the latex polymer is derived further comprises methacrylic acid. For example, the composition may comprise methacrylic acid in an amount of 0 wt % to about 15 wt %, about 0.1 wt % to about 15 wt %, for example, about 0.25 wt % to about 10 wt %, or about 0.25 wt % to about 6 wt %.

In some examples, the composition from which the latex polymer is derived further comprises an alkyl meth(acrylate)

monomer and/or (meth)acrylic acid. In some examples, the composition from which the latex polymer is derived further comprises an alkyl meth(acrylate) monomer and (meth) acrylic acid.

In some examples, the latex polymer substantially lacks a styrene component. For example, the latex polymer may comprise less than about 5 wt % styrene by total weight solids of the latex polymer, for example less than about 4 wt %, less than about 3 wt %, less than about 2 wt %, less than about 1 wt %, less than about 0.5 wt %, or less than about 0.1 wt % styrene by total weight solids of the latex polymer. In some examples, the latex polymer lacks a styrene component.

In some examples, the latex polymer may be prepared by copolymerizing the monomer components with a copolymerizable surfactant (for example surfactants from the Hitenol® AR series or Hitenol® BC series, e.g. Hitenol® BC-10, BC-30, KH-05 or KH-10) to form a latex dispersion.

In some examples, the latex polymer is prepared by combining the monomers as an aqueous emulsion with an initiator. In some examples any suitable polymer initiator may be used. In some examples, the initiator may be selected from a persulfate, such as a metal persulfate or an ammonium persulfate. In some examples, the initiator may be selected from a sodium persulfate, ammonium persulfate or potassium persulfate.

In some examples, the latex polymer has a glass transition temperature of about 20° C. or greater, for example about 30° C. or greater, about 40° C. or greater, about 45° C. or greater, or about 50° C. or greater.

In some examples, the latex polymer has a glass transition temperature of up to about 100° C., for example up to about 95° C., up to about 90° C., up to about 80° C., or up to about 70° C.

In some examples, the latex polymer has a glass transition temperature in the range of about 20° C. to about 100° C., for example about 30° C. to about 90° C., about 50° C. to about 90° C., or about 55° C. to about 70° C.

The glass transition temperature (Tg) of the latex polymer may be estimated using the Fox equation (T. G. Fox, Bull. Am. Physics Soc., Volume 1, Issue No. 3, page 123 (1956)) using the Tg of the homopolymers of each of the monomers forming the copolymer of the latex polymer. The maximum Tg of each of the homopolymers of each of the monomers making up to copolymer of the latex polymer may be taken from literature values (for example as listed in "Polymer Handbook", edited by J. Brandrup, E. H. Immergut, and E. A. Grulke, Wiley Publishers, 4$^{th}$ edition). The glass transition temperature of the latex polymer may also be determined using DSC (differential scanning calorimetry) according to ASTM D3418.

In some examples, the inkjet ink composition comprises up to about 35 wt % pigment and latex polymer solids by total weight of the composition, for example up to about 30 wt %, about 25 wt % or up to about 20 wt % pigment and latex polymer solids by total weight of the composition.

In some examples, the inkjet ink composition comprises from about 0.5 wt % to about 35 wt % pigment and latex polymer solids by total weight of the composition, for example from about 1 wt % to about 30 wt %, from about 1 wt % to about 25 wt %, or from about 2 wt % to about 20 wt % pigment and latex polymer solids by total weight of the composition. The present inventors have found that compositions having a total amount of pigment and latex polymer solids within these ranges may be suitable for inkjet printing, for example for thermal inkjet printing.

In some examples, the inkjet ink composition comprises at least about 3 wt % latex polymer by total weight of the composition, for example at least about 5 wt % latex polymer by total weight of the composition. In some examples, the inkjet ink composition comprises up to about 25 wt % latex polymer by total weight of the composition, for example up to about 20 wt %, or up to about 15 wt % latex polymer by total weight of the composition. In some examples, the inkjet ink composition comprises from about 3 wt % to about 25 wt %, for example about 5 wt % to about 25 wt % latex polymer by total weight of the composition.

Pigment

The inkjet ink composition comprises a pigment. The pigment is a yellow azo pigment. The pigment may be a yellow diazo pigment. In some examples, the pigment is Pigment Yellow 155 and has the formula II below.

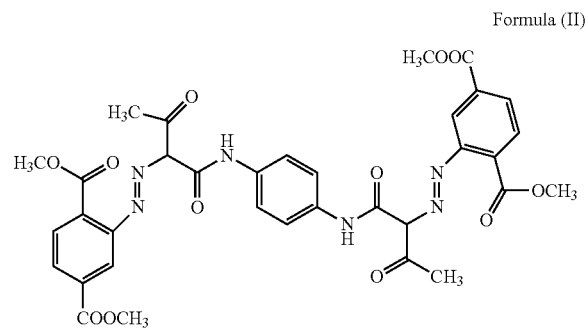

Formula (II)

Without wishing to be bound by any theory, there may be sufficient structural or chemical similarity between the yellow azo pigment and the compound of Formula I of the pigment synergist to allow the particles of the compound of Formula I to adhere or adsorb to particles of the yellow azo pigment to form, for example, compound particles of pigment. The compound particles may interact with the polymer dispersant. For example, the polymer chains of the polymer dispersant may adsorb on to the compound particles and the adsorbed polymer chains may intermingle and maintain colloidal stability, for example, by steric and/or electrostatic stabilisation. It has been found that, in a solvent environment comprising water, organic co-solvent and optional surfactants, the dispersant polymer chains (e.g. styrene acrylic polymer chains) may have a better affinity for the compound particles of pigment than particles of the yellow azo pigment alone.

The term "pigment" can include particulate dispersible colorants that can be suspended or dispersed in a liquid vehicle in accordance with embodiments of the present invention. The pigment itself can be a self-dispersed pigment or a non-self-dispersed pigment.

Suitable pigments may be commercially available in either powder or press cake form from a number of sources including, BASF™ Corporation, Toyo Corporation, DIC Corporation, Clariant Corporation, Sanyo Color Corporation and Sun Chemical™ Corporation.

In some examples, the inkjet ink composition comprises at least about 0.1 wt % pigment by total weight of the composition, for example, at least about 0.3 wt % pigment by total weight of the composition. In some examples, the inkjet ink composition comprises up to about 30 wt % pigment by total weight of the composition, for example, up to about 20 wt % pigment by total weight of the composition, or up to about 15 wt % pigment by total weight of the composition. In some examples, the inkjet ink composition comprises from about 0.1 wt % to about 30 wt %, for example 0.3 wt % to about 30 wt % pigment by total weight of the composition. In some examples, the composition comprises from 0.1 to 15 wt % pigment, for example, 0.3 to 7 wt % or 2 to 4 wt %. In some examples, the inkjet ink composition comprises an amount of pigment and an amount of latex polymer, such that the ratio of the amount of pigment to amount of latex by weight is in the range of about 0.1:15 to 10:5. In some examples, the amount of pigment to latex by weight is in the range of 4:5 to 2:20.

Water

The inkjet ink composition comprises water. The water, or a portion of the water, of the ink vehicle may be introduced to the ink vehicle as a latex polymer emulsion is combined with the co-solvent of the ink vehicle. In some examples, additional water may be added to the inkjet ink composition. The inkjet ink composition comprises water. In some examples, the inkjet ink composition comprises at least about 20 wt %, for example at least about 30 wt %, at least about 40 wt %, or at least about 50 wt % by total weight of the composition. In some examples, the inkjet ink composition comprises up to about 90 wt % water, for example up to about 85 wt %, up to about 80 wt %, or up to about 75 wt % by total weight of the composition. In some examples, the inkjet ink composition comprises water in an amount from about 20 wt % to about 85 wt % by total weight of the inkjet ink composition, for example about 30 wt % to about 80 wt %, about 40 wt % to about 80 wt %, or from about 50% to about 75% water.

Co-Solvent

The ink vehicle comprises water and an organic co-solvent (for example a blend of co-solvents). The organic co-solvent has a boiling point of 170 to 285 degrees C. In some examples, a blend of organic co-solvents may be employed. In one example, the organic co-solvent may comprise a diol, for example, a $C_4$ to $C_8$ diol. In some examples, the organic co-solvent may comprise a butanediol. In one example, the organic co-solvent may comprise a glycol ether. Suitable glycol ethers include mono-, di- or tri-alkylene glycol alkyl ethers. Examples include mono, di- or tri-($C_2$ to $C_6$)alkylene glycol ($C_1$ to $C_6$) alkyl ethers. Examples include dipropylene glycol n-butyl ether and tripropylene glycol methyl ether. In one example, the organic co-solvent may comprise a pyrrolidinone. In some examples, the organic co-solvent may comprise a diol, a glycol ether and/or a pyrrolidinone.

In some examples, the co-solvent may comprises a solvent having a boiling point in the range of about 170° C. to about 215° C.; and a solvent having a boiling point of about 220° C. or more. The solvent having a boiling point in the range of about 170° C. to about 215° C. may be a blend of solvents each solvent of the blend of solvents having a boiling point in the range of about 170° C. to about 215° C. The solvent having a boiling point of about 220° C. or more may be a blend of solvents each solvent of the blend of solvents having a boiling point of about 220° C. or more.

In some examples, the inkjet ink composition comprises about 10 wt % to about 40 wt % by total weight of the composition of the solvent having a boiling point in the range of about 170° C. to about 215° C. and about 0.1 wt % to about 8 wt % by total weight of the composition of the solvent having a boiling point of about 220° C. or more.

In some examples, the inkjet ink composition comprises: 10 wt % to about 40 wt % by total weight of the composition of a solvent having a boiling point in the range of about 170° C. to about 215° C.; and about 0.5 wt % to about 8 wt % of a solvent having a boiling point in the range of about 220° C. to about 285° C.; and/or about 0.1 wt % to about 4 wt % of a solvent having a boiling point of greater than about 285° C. and/or being insoluble in water. For example, the co-solvent may comprise solvent having a boiling point in the range of about 170° C. to about 215° C. and a second solvent having a boiling point in the range of about 220° C. to about 285° C. For example, the co-solvent may comprise a first solvent having a boiling point in the range of about 170° C. to about 215° C. and a third solvent having a boiling point of greater than about 285° C. and/or being insoluble in water. In some examples, the co-solvent comprises a first solvent having a boiling point in the range of about 170° C. to about 215° C.; and a second solvent having a boiling point in the range of about 220° C. to about 285° C.; and a third solvent having a boiling point of greater than about 285° C. and/or being insoluble in water A solvent (or blend of solvents) having a boiling point in the range of about 170° C. to about 215° C. may be referred to as a first solvent.

A solvent (or blend of solvents) having a boiling point in the range of about 220° C. to about 285° C. may be referred to as a second solvent.

A solvent (or blend of solvents) having a boiling point of greater than about 285° C. and/or having a solubility below 5% in water may be referred to as a third solvent.

In some examples, the organic co-solvent comprises a first co-solvent having a boiling point in the range of 170 to 215° C., and at least one second co-solvent having a boiling point in the range of 220° C. to about 285° C. In some examples, the organic co-solvent comprises a first co-solvent having a boiling point in the range of 170 to 215° C., and at least two second co-solvents, each having a boiling point in the range of 220° C. to about 285° C. In some examples, the organic co-solvent comprises a diol having a boiling point in the range of 170 to 215° C. In some examples, the organic co-solvent also comprises one or more glycol ether solvents, each having a boiling point in the range of 220° C. to about 285° C. The diol having a boiling point in the range of 170 to 215° C. may be present in an amount of 10 to 40 wt %, for example, 12 to 20 wt % of the total weight of the inkjet ink composition. The glycol ether solvent having a boiling point in the range of 220° C. to about 285° C. may be present in an amount of 0 to 8 wt % of the total weight of the inkjet ink composition, for example, 0.5 to 3 or 5 wt %.

First Solvent—Solvent Having a Boiling Point of 170° to 215° C.

The ink vehicle of the inkjet ink composition may comprise a solvent having a boiling point of about 170° C. to 215° C. (this solvent is referred to as the first solvent). In some examples, the first solvent has a boiling point of at least about 175° C., at least about 180° C., or at least about 185° C. In some examples, the first solvent has a boiling point in the range of about 180° C. to about 215° C., for example about 185° C. to about 215° C.

In some examples, the first solvent may be selected from an aliphatic alcohol, for example a primary aliphatic alcohol, a secondary aliphatic alcohol or a tertiary aliphatic alcohol. The aliphatic alcohol may be a diol. In some examples, the first solvent is an aliphatic alcohol containing 10 carbons or less, for example 8 carbons or less or 6 carbons or less. In some examples, the first solvent is an aliphatic alcohol being a diol containing 10 carbons or less, for example 8 carbons or less or 6 carbons or less.

In some examples, the first solvent is selected from the group comprising 1,2-propanediol, 1,2-butanediol, ethylene glycol, 2-methyl-2,4-pentanediol, 1,3-butanediol, 2-methyl- 1,3-propanediol and 1,3-propanediol. In some examples the first solvent is selected from the group comprising 1,2-propanediol, 1,2-butanediol, ethylene glycol, 2-methyl-2,4-pentanediol, and 1,3-butanediol. In some examples the first solvent is selected from the group consisting of 1,2-propanediol, 1,2-butanediol, ethylene glycol, 2-methyl-2,4-pentanediol, 1,3-butanediol, 2-methyl-1,3-propanediol and 1,3-propanediol. In some examples the first solvent is selected from the group consisting of 1,2-propanediol, 1,2-butanediol, ethylene glycol, 2-methyl-2,4-pentanediol, and 1,3-butanediol. In some examples the first solvent is 1,2-butanediol.

The boiling points of 1,2-propanediol, 1,2-butanediol, ethylene glycol, 2-methyl-2,4-pentanediol, 1,3-butanediol, 2-methyl-1,3-propanediol and 1,3-propanediol are listed in Table 1 below.

TABLE 1

| First solvent | Boiling point (° C.) |
| --- | --- |
| propylene glycol (1,2-propanediol) | 188 |
| 1,2-butanediol | 194 |
| ethylene glycol | 196 |
| 2-methyl-2,4-pentanediol (hexylene glycol) | 198 |
| 1,3-butanediol | 203 |
| 2-methyl-1,3-propanediol (MPdiol) | 213 |
| 1,3-propanediol | 214 |

In some examples, the inkjet ink composition comprises at least about 5 wt % of the first solvent by total weight of the composition.

In some examples, the inkjet ink composition comprises up to about 35 wt % of the first solvent by total weight of the composition, for example up to about 30 wt %, or up to about 20 wt % by total weight of the composition.

In some examples, the inkjet ink composition comprises the first solvent (e.g. a blend of first solvents) in an amount of from about 5 wt % to about 35 wt % by total weight of the composition, for example from about 10 wt % to about 30 wt %, about 10 wt % to about 20 wt %, or from about 15 wt % to about 20 wt % by total weight of the composition.

Second Solvent—Solvent Having a Boiling Point in the Range of about 220° C. to about 285° C.

The ink vehicle of the inkjet ink composition may comprise a second solvent (for example a blend of solvents) having a boiling point in the range of about 220° C. to about 285° C., for example about 225° C. to about 285° C.

In some examples the second solvent is selected from alcohols (including aliphatic alcohols and aromatic alcohols), esters, glycol ethers, di- and tri-alkylene glycols, amides, lactams and sulfones. In some examples the solvent is selected from aliphatic alcohols (including primary, secondary and tertiary aliphatic alcohols, including diols), aromatic alcohols, esters, alkylene glycol alkyl ethers (including di-, tri- and tetra-alkylene glycol alkyl ethers), glycol aryl ethers (such as alkylene glycol aryl ethers, including di- and tri-alkylene glycol aryl ethers), di- and tri-alkylene glycols, lactams (such as 2-pyrrolidinone) and sulfones (such as sulfolane).

In some examples, the second solvent is selected from aliphatic alcohols containing 20 carbons or less (for example aliphatic alcohols containing 10 carbons or less), esters containing 20 carbons or less (for example esters containing 12 carbons or less), glycol alkyl ethers, such as alkylene glycol alkyl ethers, containing 20 carbons or less (for example esters containing 12 carbons or less, or 10 carbons or less), glycol aryl ethers, such as alkylene glycol aryl ethers, containing 20 carbons or less (for example esters containing 12 carbons or less, or 10 carbons or less) such as glycol phenyl ethers (e.g. alkylene glycol phenyl ethers) containing 20 carbons or less, lactams and cyclic sulfones.

In some examples the second solvent is selected from the group comprising ethylene glycol 2-ethylhexyl ether, dipropylene glycol n-butyl ether, diethylene glycol n-butyl ether, propylene glycol phenyl ether, 2-pyrrolidinone, tripropylene glycol methyl ether, 2,2,4-trimethyl-1,3-pentanediol monoisobutyrate, triethyl citrate, tripropylene glycol n-propyl ether, tripropylene glycol n-butyl ether, tetraethylene glycol dimethyl ether, and dipropylene glycol phenyl ether. In some examples, the second solvent is selected from the group comprising 2-pyrrolidinone, tripropylene glycol methyl ether and tripropylene glycol n-butyl ether.

The boiling points of examples of second solvents are listed in table 2 below.

TABLE 2

| Second solvent | Boiling point (° C.) |
| --- | --- |
| ethylene glycol 2-ethylhexyl ether (Eastman EEH) | 229 |
| dipropylene glycol n-butyl ether (Dowanol ™ DPnB) | 230 |
| diethylene glycol n-butyl ether (Butyl Carbitol) | 230 |
| propylene glycol phenyl ether (Dowanol ™ PPh) | 243 |
| 2-pyrrolidinone | 245 |
| tripropylene glycol methyl ether (Dowanol ™ TPM) | 245 |
| 2,2,4-trimethyl-1,3-pentanediol monoisobutyrate (Texanol ™) | 254 |
| triethyl citrate | 261 |
| tripropylene glycol n-propyl ether | 261 |
| tripropylene glycol n-butyl ether (Dowanol ™ TPnB) | 274 |
| tetraethylene glycol dimethyl ether (tetraglyme) | 275 |
| dipropylene glycol phenyl ether (Dowanol ™ DiPPh) | 280 |

In some examples, the inkjet ink composition comprises at least about 0.1 wt % of the second solvent by total weight of the composition, for example at least about 0.5 wt %, at least about 1 wt %, at least about 1.5 wt %, or about 2 wt % by total weight of the composition.

In some examples, the inkjet ink composition comprises up to about 8 wt % of the second solvent by total weight of the composition, for example up to about 5 wt %, up to about 3 wt %, or about 2 wt % by total weight of the composition.

In some examples, the inkjet ink composition comprises the second solvent (e.g. a blend of second solvents) in an amount of from about 0 wt % to about 8 wt % by total weight of the composition, for example from about 0.1 wt % to about 8 wt %, about 0.5 wt % to about 8 wt %, from about 0.5 wt % to about 5 wt %, or from about 0.5 wt % to about 4 wt % by total weight of the composition.

Third Solvent—a Solvent (or Solvent Blend) Having a Boiling Point of Greater than about 285° C. and/or being Insoluble in Water.

In some examples, the ink vehicle comprises a third solvent. In some examples, the ink vehicle comprises a first solvent and a third solvent. In some examples, the ink vehicle comprises a first solvent, a second solvent and a third solvent. The third solvent (e.g. a blend of third solvents) may be present in the inkjet ink composition in an amount of at least about 0.05 wt % by total weight of the composition, for example at least about 0.1 wt %, or at least about 0.2 wt % by total weight of the composition. In some examples the third solvent is present in the inkjet ink composition in an amount up to about 4 wt %, for example up to about 2 wt % or up to about 1 wt %. In some examples the third solvent is present in the inkjet ink composition in an amount from 0 wt % to about 4 wt %, for example about 0.1 wt % to about 4 wt %, about 0.1 wt % to about 2 wt %, or about 0.2 wt % to about 1 wt %.

In some examples, the third solvent is a component which remains in an ink layer printed on a print substrate after the inkjet ink composition has been cured such that at least a portion of the water and the first solvent, and optionally the second solvent have been removed.

In some examples, the third solvent has a boiling point of greater than about 285° C.

In some examples, the third solvent is a water soluble third solvent, for example a water soluble solvent having a boiling point of greater than about 285° C. In some examples a water soluble third solvent is a third solvent having a water solubility of greater than about 5% in water, for example greater than about 10%, greater than about 25%, greater than about 50%, greater than about 75%, greater than about 80%, or greater than about 90% in water. In some examples, when the third solvent is a water soluble third solvent the third solvent is present in the ink composition in an amount between 0.1 wt % and 4 wt % by total weight of the ink composition, for example between 0.2 wt % and 4 wt % by total weight of the ink composition.

The term "insoluble" used in the present disclosure may be used to refer to a solvent having a water solubility of less than about 10%, for example less than about 5%, less than about 4.5%, or less than about 4%. Solubility of the third solvent in water may be determined as the amount of solvent by weight which may be dissolved in 100 g of water (under conditions of standard temperature and pressure) to produce a saturated solution. Alternatively the solubility of the third solvent may be determined by referring to data provided by the manufacturer.

In some examples, when the third solvent is a water insoluble third solvent the third solvent is present in the ink composition in an amount between 0.1 wt % and 1 wt % by total weight of the ink composition, for example between 0.2 wt % and 1 wt % by total weight of the ink composition.

In some examples, the third solvent may be insoluble in water (for example have a water solubility of less than about 10%) and have a boiling point of greater than about 285° C.

In some examples, the third solvent is selected from the group comprising esters (such as citrates, e.g. triethyl citrate, and 2,2,4-trimethyl-1,3-pentanediol monoisobutyrate), glycol esters, glycol ether-esters, glycol ethers, lactams and phosphate ethers. In some examples, the third solvent may be selected from the group comprising esters containing 30 carbons or less; glycol esters, such as alkylene glycol esters, optionally containing 30 carbons or less; glycol ether-esters (such as triethylene glycol n-pentyl ether benzoate; triethylene glycol n-hexyl ether benzoate; tripropylene glycol n-butyl ether benzoate; tripropylene glycol n-pentyl ether benzoate; dipropylene glycol n-butyl ether benzoate; dipropylene glycol 2-ethylhexyl ether benzoate; dipropylene glycol phenyl ether benzoate; ethylene glycol n-hexyl ether levulinate; diethylene glycol n-hexyl ether levulinate; diethylene glycol phenyl ether levulinate; triethylene glycol n-butyl ether levulinate; dipropylene glycol phenyl ether levulinate; tripropylene glycol methyl ether levulinate; tripropylene glycol n-propyl ether levulinate; and tripropylene glycol n-butyl ether levulinate); glycol ethers, such as glycol aryl ethers (e.g. alkylene glycol aryl ethers) such glycol phenyl ethers (e.g. alkylene glycol phenyl ethers) optionally containing 30 carbons or less, and glycol alkyl ethers (e.g. alkylene glycol alkyl ethers) optionally containing 30 carbons or less lactams and phosphate ethers.

In some examples, the third solvent is selected from the group comprising: Benzoflex™ 2088, Benzoflex™ 50, Benzoflex™ LA-705, dibutyl sebacate, Dowanol™ DiPPh, Eastman™ 168 (bis(2-ethylhexyl) terephthalate), Eastman™ EEH (ethylene glycol 2-ethylhexyl ether), Eastman™ TXIB Formulation Additive (2,2,4-trimethyl-1,3-pentanediol diisobutyrate), Hexamoll™ DINCH™ (1,2-Cyclohexane dicarboxylic acid diisononyl ester), Loxanol CA 5310 (propylene glycol mono oleate), Loxanol™ CA 5320 (propylene glycol monoester of C-18 fatty acids), Optifilm™ 300 (2,2,4-trimethyl-1,3-pentanediol diisobutyrate), Optifilm™ 400 (triethylene glycol bis(2-ethylhexanoate), Texanol™ (2,2,4-trimethyl-1,3-pentanediol monoisobutyrate), triethyl citrate, triethylene glycol bis(2-ethylhexanoate), tris(2-butoxyethyl)phosphate, UCAR™ Filmer IBT (2,2,4-trimethyl-1,3-pentanediol monoisobutyrate), Velate™ 368 (2-ethylhexylbenzoate), N-(2-hydroxyethyl)-2-pyrollidinone, triethylene glycol n-pentyl ether benzoate, triethylene glycol n-hexyl ether benzoate, tripropylene glycol n-butyl ether benzoate, tripropylene glycol n-pentyl ether benzoate, dipropylene glycol n-butyl ether benzoate, dipropylene glycol 2-ethylhexyl ether benzoate, dipropylene glycol phenyl ether benzoate, ethylene glycol n-hexyl ether levulinate, diethylene glycol n-hexyl ether levulinate, diethylene glycol phenyl ether levulinate, triethylene glycol n-butyl ether levulinate, dipropylene glycol phenyl ether levulinate, tripropylene glycol methyl ether levulinate, tripropylene glycol n-propyl ether levulinate, and tripropylene glycol n-butyl ether levulinate.

Other Additives

The ink vehicle may also comprise a variety of additional components, suitable for inkjet ink compositions, selected from surfactants (for example suitable surfactants may be selected form alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amides, dimethicone copolyols, fluoroalkyl polyethylene oxides, substituted amine oxides, and the like.

Other examples of suitable surfactants include fluorosurfactants, for example non-ionic surfactants, phosphate esters and/or trisodium salt of methyl glycine diacetic acid.

Surfactants when present may be present in an amount from 0.01 wt % to 10 wt %, for instance, 0.1 to 2 or 3 wt %).

Surfactants may be included to increase the wettability of the inkjet composition onto substrates, for example, non-porous substrates.

Other possible components include buffers, biocides (such as Nuosept™ (Nudex™ Inc.), Ucarcide™ (Union carbide Corp™.), Vancide™ (R. T. Vanderbilt™ Co.), Proxel™ (Lonza™), and combinations thereof), viscosity modifiers, sequestering agents (such as EDTA (ethylene diamine tetraacetic acid)), stabilizing agents, wetting agents, and humectants. In some examples, these other additives may be present in a total amount of from 0 wt % to 20 wt %.

Method of Production

The inkjet ink composition may be prepared by milling the azo yellow pigment with the compound of Formula I. This milling may facilitate contact and adsorption of the compound of the Formula I onto the surface of the azo yellow pigment particles. The milled particles may be contacted with the polymer dispersant. As mentioned above, the polymer may adhere to the particles to improve their colloidal stability.

Where the polymer dispersant is solid, it may be dissolved in solution, for example, by dissolving the dispersant in a hydroxide solution. For example, where a styrene acrylic polymer dispersant is employed, the dispersant may be dissolved in a hydroxide solution. The azo yellow pigment (e.g. PY155) may be contacted with the dissolved dispersant, the compound of Formula I and, optionally, the organic co-solvent. The suspension may then be milled, for example, with solid beads (e.g. yttrium zirconium) at a specified energy level. The colloidal suspension produced may then be diluted, for example, with water to a solids content of e.g. 10 to 30 wt %, for example, 15 to 25 wt %. The pH of the resulting colloidal suspension may be controlled to, for example, pH 7 to 11 for example, pH 9.0. The particle size may be controlled by filtration.

Method of Printing

Example inkjet ink compositions of the present disclosure may be printed onto a print substrate (e.g. a non-porous print substrate) to form an inkjet ink layer (also referred to as an ink layer) on the print substrate. The ink layer formed on the print substrate comprises the inkjet ink composition comprising the latex polymer and ink vehicle. Any suitable inkjet printing method may be employed, for example, thermal inkjet printing.

In some examples, the method of printing comprises curing the latex polymer, for example curing the latex polymer on the print substrate (e.g. non-porous print substrate). Curing of the latex polymer forms a film of latex on the surface of the print substrate. Curing the latex polymer to form a film of latex on the print substrate improves the durability of an image printed using the inkjet ink composition.

In order for the latex polymer to be cured, water may be evaporated from the ink layer. Thereafter the co-solvent (for example, first solvent and second solvent (where present)) may be at least partially evaporated from the ink layer such that particles of latex polymer come into contact. Once the particles of the latex polymer come into closer contact (due to the at least partial evaporation of water and co-solvent) the particles of the latex polymer may coalesce by the intermingling of polymer chains between adjacent latex polymer particles to cure the latex polymer to from a latex polymer film. In order for the latex polymer to be cured the temperature must be above the minimum film formation temperature (MFFT) of the latex polymer. Pigment particles, where present, remain in the ink layer and are embedded within the latex polymer film on curing of the latex polymer.

Water may be evaporated from the printed inkjet ink composition before the co-solvent (e.g. first and second solvent and/or third solvent) are at least partially removed (evaporated) from the printed inkjet ink composition as water has a higher volatility (e.g. lower boiling point) than the co-solvent.

In some examples, the co-solvent comprises a first solvent and a second solvent. In such examples, the first solvent may be evaporated, or at least partially evaporated, before the second solvent. The second solvent may remain in the ink layer after the water has been evaporated and the first solvent at least partially evaporated.

Where a co-solvent comprises a solvent having a boiling point of 170° C. to 215° C. (i.e. a first solvent) in the inkjet ink composition, this can allow for fast drying of the inkjet ink composition to enable high throughput through a printing system. It has been found that the presence of a second solvent and/or third solvent in the inkjet ink composition which remains in the ink layer after evaporation of the water and at least partial evaporation of the first solvent ensures that the MFFT of the latex polymer remains lowered during the curing of the latex polymer.

In some examples, curing the latex polymer may comprise evaporating water from the ink layer. In some examples, curing the latex polymer comprises evaporating water and at least a portion of the co-solvent from the ink layer. Evaporation of water and at least a portion of the co-solvent allows latex polymer particles within the ink layer to coalesce into a film ("cure"). Evaporation may be facilitated in a printing system by providing heat and/or airflow. Heating may be either conductive, radiative, or convective. Airflow may comprise parallel or impinging airflow. In some examples, heating the ink layer to evaporate water, for example water and at least a portion of co-solvent comprises heating the ink layer such that the temperature of the print substrate is maintained below a temperature at which deformation (e.g. warping) of the print substrate occurs. For example, heating the ink layer such that the print substrate reaches a temperature of less than about 70° C., for example about 65° C. or less.

In some examples, curing the latex polymer comprises evaporating substantially all of the water from the ink layer, for example evaporating at least about 95 wt %, for example at least about 99 wt %, or at least about 99.5 wt % of the water comprised in the inkjet ink composition printed as the ink layer. In some examples, curing the latex polymer comprises evaporating all of the water from the ink layer so that no water remains in the ink layer.

In some examples, curing the latex polymer comprises evaporating at least a portion of the co-solvent comprises evaporating a major amount of the co-solvent of the inkjet ink composition printed as the ink layer from the ink layer. In some examples, evaporating at least a portion of the co-solvent comprises evaporating at least about 80 wt % of the first solvent, at least about 90 wt % of the first solvent, at least about 95 wt % of the first solvent, or at least about 99 wt % of the of the first solvent comprised in the inkjet ink composition printed as the ink layer.

In some examples, the second and/or third solvent is not evaporated from the ink layer during curing of the latex polymer. In some examples, at least a portion of the second and/or third solvent remain in the ink layer after curing of the latex polymer.

In some examples, curing the latex polymer comprises heating the latex polymer such that latex polymer particles coalesce to form a latex polymer film. Forming a latex polymer film occurs after evaporation of water from the ink layer and at least partial evaporation of the first solvent. In some examples, forming a latex polymer film occurs after evaporation of water from the ink layer and at least partial evaporation of the first solvent and second and/or third solvent (when present). Forming a latex polymer film may comprise heating the ink layer to a temperature greater that the MFFT of the latex polymer in the ink layer. In some examples, forming a latex polymer film comprises heating the ink layer to a temperature greater that the MFFT of the latex polymer in the ink layer and a temperature less than a temperature which may cause deformation of the print substrate.

In some examples, the method of printing comprises selecting an inkjet ink composition such that the MFFT of the latex polymer is below a temperature which may cause deformation of the print substrate.

EXAMPLES

The following illustrates examples of the compositions and related aspects described in the present disclosure. Thus, these examples should not be considered to restrict the present disclosure, but are merely in place to teach how to make examples of compositions of the present disclosure.

Example 1—Preparation of Latex

The latex polymer was prepared as follows. Water (169 g) was heated to 77° C. with mechanical agitation. An aqueous emulsion comprised of water (13.7 g), copolymerizable surfactant Hitenol® BC-10 (0.70 g) (Dai-Ichi Kogyo Seiyaku™ Co., Ltd), styrene (17.7 g) and butyl acrylate (37.5 g) was prepared. At 77° C., 2 g (3%) of this monomer emulsion was added to the reactor followed by 0.37 g potassium persulfate (dissolved in a minimal amount of water). After 15 minutes, this monomer mixture was added to the reactor over 72 minutes. When the first polymerization was completed, a second emulsion comprised of water (34.9 g), copolymerizable surfactant Hitenol® BC-10 (1.6 g), styrene (21.1 g), methyl methacrylate (99.0 g), butyl acrylate (6.1 g) and methacrylic acid (2.6 g) was added over 168 minutes. Residual monomer was reduced by typical methodology; i.e., using ascorbic acid and t-butyl hydroperoxide. After cooling to near ambient temperature, pH was adjusted to about 8 with dilute potassium hydroxide; inkjet suitable aqueous biocides were added. The two monomer compositions' average homopolymer refractive indices were 1.5±0.2. The resulting acrylic latex was 41% solids; particle size 0.23μ; viscosity <50 cps.

Example 2—Yellow Dispersions

Example 2A

Yellow dispersions were prepared by combining a yellow azo pigment (PY155 powder) with a styrene acrylic polymeric dispersant, Solsperse® 27000 and a co-solvent. The components were mixed in a high speed disperser. The mixture was then milled using zirconium oxide beads to achieve a stable dispersion.

Example 2 B

Yellow dispersions were prepared by combining a yellow azo pigment (PY155 powder) with 90% KOH-neutralised styrene acrylic polymeric dispersant and a co-solvent. The components were mixed in a high speed disperser. The mixture was then milled using zirconium oxide beads to achieve a stable dispersion.

Example 2C

Yellow dispersions were prepared by combining a yellow azo pigment (PY155 powder) with a styrene acrylic polymeric dispersant, a co-solvent and a pigment synergist (BYK-SYNERGIST® 2105 supplied by Altana or Solsperse® 22000 supplied by Lubrizol). The components were mixed in a high speed disperser. The mixture was then milled using zirconium oxide beads to achieve a stable dispersion.

Example 3—Inkjet Ink Compositions

The latex polymer formed prepared in Example 1 was used to produce an inkjet ink composition having the composition shown in the table below.

| Components | Amount (wt %) |
|---|---|
| 1,2-butanediol | 18.00 |
| Tripropylene glycol methyl ether (Dowanol ® TPM supplied by Dow ®Chemical) | 2.00 |
| Tripropylene Glycol n-Butyl Ether (Dowanol ® TPnB supplied by Dow ® Chemical) | 0.70 |
| Water | 64.59 |
| Nonionic and anionic wetting agents | 1.00 |
| Chelating agents | 0.05 |
| Latex Dispersion of Example 1 | 10.00 |
| Yellow Dispersions of Example 2 | 3.67 |
| Total | 100.00 |

Example 4

The inks of Example 3 were tested for a range of performance attributes. The results are summarized in the Table below:

| | Pigment Dispersion | | |
|---|---|---|---|
| Testing | Example 2A | Example 2B | Example 2C |
| 60° C. heat aging stability | poor | fair to poor | good |
| freeze/thaw aging stability | poor | poor | good |
| kogation | good | good | good |
| decap | good | good | good |
| color gamut | good | good | good |
| durability on rigid fluted PP and acrylic | poor | good | good |
| durability on flexible vinyl film | good | good | good |

Testing:

Aging stability was estimated by heating the inks at 60° C. in an oven, and measuring changes in light scattering particle sizes and viscosities over time out to 4 weeks Freeze/thaw stability was measured by repeated cycling of the inks between −40° C. and +70° C. in a programmable oven and measuring changes in light scattering particle sizes and viscosities after 3 days.

| Dispersion | Condition | Viscosity | 50% Particle size (μm) | 95% Particle size (μm) |
|---|---|---|---|---|
| 2A | Start | 5.7 | 0.28 | 0.51 |
| | freeze/thaw | 6.6 | 0.28 | 0.49 |
| | 2 wk 60 C. | 6.5 | 0.28 | 0.45 |
| | 4 wk 60 C. | 6.4 | 0.27 | 0.47 |
| 2B | Start | 5.7 | 0.26 | 0.43 |
| | freeze/thaw | 6.9 | 0.33 | 0.64 |
| | 2 wk 60 C. | 7.5 | 0.33 | 0.66 |
| | 4 wk 60 C. | 7.8 | 0.35 | 0.67 |
| 2C | Start | 5.2 | 0.24 | 0.37 |
| | freeze/thaw | 5.1 | 0.24 | 0.37 |
| | 2 wk 60 C. | 4.9 | 0.23 | 0.35 |
| | 4 wk 60 C. | 4.9 | 0.24 | 0.38 |

Kogation was tested by printing the inks in a modified HP Latex 360 testbed out to 200 million drops per nozzle, and measuring changes in drop velocity using the drop detect laser velocimeter in the testbed.

Decap was measured by printing the compositions from an inkjet printhead and then waiting for 7 seconds, and then counting the number of spits (printhead firings) required to bring the nozzle back to full health, as measured by looking at printed line health (density and trajectory).

Color gamut was measured on printed squares using an X-rite colorimeter.

Durability was measured by a combination of tape adhesion and wet rub resistance.

Tape adhesion was measured with using the cross-hatch tape adhesion test which was carried out as defined in ASTM D3359 09, except that Intertape Polymer Group™ 515965 tape was used in place of Permacel™ P99 test tape. The numbers 1-5 provided in Table X refer to the amount of latex ink removed from each of the samples following this test according to the following scale:

Test Scale:
1=0% removed
2=<5% removal
3=5-15% removal
4=15-35% removal
5=35-65% removal
6=>65% removal Wet rub resistance was measured on a Taber® linear abraser model 5750 equipped with an acrylic crockmeter tip covered with polyester cloth. Wiping fluids were Windex Blue® window cleaner and 70% isopropyl alcohol. The cloth was dipped in the rubbing fluid, and the printed image was rubbed 5× with 600 g pressure. Plot damage and wiper cleanliness are graded with the following scale:

| Taber® Score | Plot Damage | Wiper Appearance | Criteria for Scoring |
|---|---|---|---|
| 0 | none | clean | no damage, no color transfer, clean wiper |
| 0.5 | none | hint of color | No damage (including gloss), no color loss, faint transfer to wiper |
| 1 | gloss loss | light ink transfer | no color loss - only gloss loss, light transfer to wiper |
| 2 | significant | significant transfer | 0-20% color loss |
| 3 | severe | significant transfer | 20-50% color loss |
| 4 | severe | significant transfer | 50-80% color loss |
| 5 | severe | significant transfer | >80% color loss |

Durability Scores:

| | Pigment Dispersion | | |
|---|---|---|---|
| Test Score | Example 2A | Example 2B | Example 2C |
| Taber Windex® rub Avery MPI2900 self adhesive vinyl | 0 | 0 | 0 |
| Taber Windex® rub Intepro® fluted polypropylene | 2 | 1 | 1 |
| Taber Windex® rub Plexiglas® | 2 | 1 | 1 |
| Taber 70% IPA rub Intepro® fluted polypropylene | 4 | 0 | 0 |
| Taber 70% IPA rub Plexiglas® | 4 | 0 | 0 |
| Tape Adhesion Avery MPI2900 self adhesive vinyl | 0 | 0 | 0 |
| Tape Adhesion Intepro® fluted polypropylene | 0 | 0 | 0 |
| Tape Adhesion Plexiglas® | 0 | 0 | 0 |

The invention claimed is:

1. An aqueous inkjet ink composition comprising:
   a yellow azo pigment,
   a pigment synergist comprising a compound of Formula I,

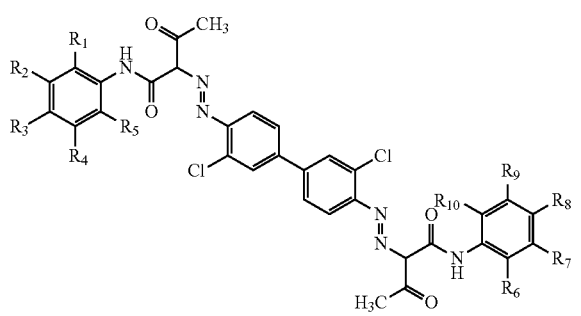

where each of $R_1$ to $R_{10}$ is independently selected from H, a carboxylate and/or a sulphonate group, and a precipitating agent comprising a magnesium, strontium, or aluminium compound,
   a polymeric dispersant,
   5 to 20 wt % of a latex polymer,
   5 to 40 wt % of an organic co-solvent that has a boiling point of a boiling point in the range of about 170° C. to about 285° C., and
   water.

2. A composition as claimed in claim 1, wherein the yellow azo pigment is Pigment Yellow 155.

3. A composition as claimed in claim 1, wherein the pigment synergist comprises Pigment Yellow 12 or a sulphonated or carboxylated derivative thereof.

4. A composition as claimed in claim 1, wherein the precipitating agent includes an aluminium compound.

5. A composition as claimed in claim 4, wherein the precipitating agent comprises aluminium oxide and/or aluminium nitrate.

6. A composition as claimed in claim 1, which comprises about 0.1 to about 3 wt % of pigment synergist.

7. A composition as claimed in claim 1, which comprises about 1 to about 8 wt % polymeric pigment dispersant.

8. A composition as claimed in claim 1, wherein the polymeric pigment dispersant is a styrene acrylic resin.

9. A composition as claimed in claim 1, wherein the organic co-solvent comprises a first co-solvent having a boiling point in the range of about 170° C. to about 215° C.

10. A composition as claimed in claim 9, wherein the first co-solvent is selected from at least one of 1,2-propanediol, 1,2-butanediol, ethylene glycol, 2-methyl-2,4-pentanediol, 1,3-butanediol, 2-methyl-1,3-propanediol and 1,3-propanediol.

11. A composition as claimed in claim 9, wherein the organic co-solvent comprises a second co-solvent that has a boiling point of about 220° C. to about 285° C.

12. A composition as claimed in claim 1, wherein the latex polymer comprises a (meth)acrylate or a (meth)acrylamide polymer or copolymer.

13. A composition as claimed in claim 1, which comprises 0.1 to 2 wt % surfactant.

14. An inkjet cartridge comprising the composition of claim 1.

15. A printed substrate comprising a rigid non-porous print medium, wherein the rigid non-porous print medium has a latex layer deposited on its surface, and wherein the latex layer encapsulates a yellow azo pigment, a pigment synergist and a polymeric dispersant, said pigment synergist comprising a compound of Formula

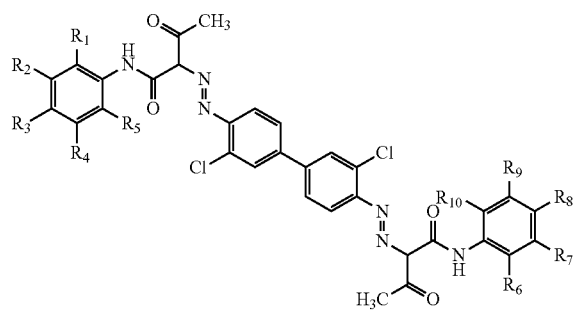

(I)

where each of $R_1$ to $R_{10}$ is independently selected from H, a carboxylate and/or a sulphonate group, and a precipitating agent comprising a magnesium, strontium, or aluminium compound.

16. The printed substrate of claim 15, wherein the precipitating agent includes an aluminium compound.

17. The printed substrate of claim 16, wherein the precipitating agent comprises aluminium oxide, aluminium nitrate, or a combination thereof.

18. The printed substrate of claim 15, wherein the polymeric pigment dispersant is a styrene or acrylic resin.

19. The printed substrate of claim 15, wherein the yellow azo pigment is Pigment Yellow 155.

20. The printed substrate of claim 15, wherein the latex layer comprises a (meth)acrylate or a (meth)acrylamide polymer or copolymer.

* * * * *